(12) United States Patent
Shearer et al.

(10) Patent No.: US 9,261,395 B2
(45) Date of Patent: Feb. 16, 2016

(54) LIQUID LEVEL SENSING SYSTEM

(71) Applicant: Goodrich Corporation, Charlotte, NC (US)

(72) Inventors: Jon Douglas Shearer, Hartville, OH (US); Sabeshan Sean Periyathamby, Copley, OH (US)

(73) Assignee: Goodrich Corporation, Charlotte, NC (US)

( * ) Notice: Subject to any disclaimer, the term of this patent is extended or adjusted under 35 U.S.C. 154(b) by 333 days.

(21) Appl. No.: 13/765,231

(22) Filed: Feb. 12, 2013

(65) Prior Publication Data

US 2013/0205893 A1    Aug. 15, 2013

Related U.S. Application Data

(60) Provisional application No. 61/598,320, filed on Feb. 13, 2012.

(51) Int. Cl.
 *G01F 23/26* (2006.01)
 *G01F 23/00* (2006.01)

(52) U.S. Cl.
 CPC .............. *G01F 23/00* (2013.01); *G01F 23/268* (2013.01)

(58) Field of Classification Search
 CPC ... G01F 23/268; G01F 23/265; G01F 23/263; G01F 23/241; G01F 23/247; G01F 23/261; G01F 25/0061; G01F 1/007; G01F 23/00; G01F 23/0023
 See application file for complete search history.

(56) References Cited

U.S. PATENT DOCUMENTS

| | | | |
|---|---|---|---|
| 2,868,015 A * | 1/1959 | Haropulos | ................... 73/304 R |
| 2,950,601 A | 8/1960 | Wightman | |
| 3,986,110 A | 10/1976 | Overall et al. | |
| 4,235,106 A | 11/1980 | Maltby et al. | |
| 4,389,900 A | 6/1983 | Gutierrez | |
| 4,412,270 A | 10/1983 | Weitz, Jr. et al. | |
| 4,412,450 A | 11/1983 | Franz et al. | |
| 4,449,405 A | 5/1984 | Franz et al. | |
| 4,540,936 A | 9/1985 | Walsh | |
| 4,553,434 A | 11/1985 | Spaargaren | |
| 4,591,946 A | 5/1986 | Pope | |
| 4,676,101 A | 6/1987 | Baughman | |
| 4,736,638 A | 4/1988 | Okawa et al. | |
| 4,912,976 A | 4/1990 | Labriola, II | |

(Continued)

FOREIGN PATENT DOCUMENTS

| DE | 10063557 A1 | 7/2002 |
|---|---|---|
| DE | 102010030362 A1 | 12/2011 |
| GB | 1392567 A | 4/1975 |

OTHER PUBLICATIONS

European Search Report for Application No. 13155124.4-1553; Date of Mailing May 31, 2013, pp. 1-7.

*Primary Examiner* — David A Rogers
(74) *Attorney, Agent, or Firm* — Cantor Colburn LLP

(57) ABSTRACT

A linear liquid level sensing system (10) comprises a vessel (20), an electrically conductive liquid (30) contained within the vessel (20), and a collector (40) spanning a vertical distance corresponding to the desired-level-determining range. An insulator (50) encases the collector (40) to define a dielectric gap between it and the fluid (30), with the insulated area in contact with the fluid (30) correlating with the fluid level. A single electrical line (60) connects the collector (40) to both a voltage-supplying source (70) and a charge-sensing device (80).

18 Claims, 3 Drawing Sheets

(56) References Cited

U.S. PATENT DOCUMENTS

| | | | |
|---|---|---|---|
| 4,924,702 A | 5/1990 | Park | |
| 5,017,909 A * | 5/1991 | Goekler | 340/620 |
| 5,027,075 A | 6/1991 | Harding, Jr. | |
| 5,043,707 A * | 8/1991 | Heinze | 340/618 |
| 5,081,696 A | 1/1992 | Beck | |
| 5,135,485 A * | 8/1992 | Cohen et al. | 604/67 |
| 5,142,909 A * | 9/1992 | Baughman | 73/304 C |
| 5,156,047 A | 10/1992 | Tuma et al. | |
| 5,182,545 A * | 1/1993 | Goekler | G01F 23/265 324/690 |
| 5,270,210 A | 12/1993 | Weyrauch et al. | |
| 5,315,872 A * | 5/1994 | Moser | 73/304 C |
| RE34,731 E * | 9/1994 | Lee et al. | 73/304 C |
| 5,554,937 A | 9/1996 | Sanders et al. | 324/664 |
| 5,600,997 A * | 2/1997 | Kemp et al. | 73/290 V |
| 5,613,399 A * | 3/1997 | Hannan et al. | 73/304 C |
| 5,726,908 A * | 3/1998 | Hosmer | F17C 13/008 361/284 |
| 5,747,689 A * | 5/1998 | Hampo et al. | 73/304 C |
| 5,765,434 A | 6/1998 | Harbaugh | |
| 6,075,464 A * | 6/2000 | Cloutier et al. | 340/870.37 |
| 6,362,632 B1 * | 3/2002 | Livingston | G01F 23/266 324/629 |
| 6,457,355 B1 * | 10/2002 | Philipp | 73/304 C |
| 6,490,920 B1 | 12/2002 | Netzer | |
| 6,563,328 B1 * | 5/2003 | Lenormand et al. | 324/663 |
| 6,776,900 B2 * | 8/2004 | Mazurek et al. | 210/115 |
| 6,844,743 B2 | 1/2005 | Lenormand et al. | |
| 6,943,566 B2 * | 9/2005 | Florin et al. | 324/662 |
| 7,256,588 B2 * | 8/2007 | Howard et al. | 324/663 |
| 7,258,005 B2 | 8/2007 | Nyce | |
| 7,284,427 B2 * | 10/2007 | Calabrese | 73/304 R |
| 7,334,471 B2 * | 2/2008 | Maatuk | 73/304 R |
| 7,712,364 B2 | 5/2010 | Radhakrishnan et al. | |
| 7,938,002 B1 * | 5/2011 | Lazos | 73/290 B |
| 7,992,437 B2 * | 8/2011 | Tshishiku | 73/431 |
| 7,997,132 B2 * | 8/2011 | Ross et al. | 73/304 C |
| 8,096,178 B2 | 1/2012 | Wernet et al. | |
| 8,117,910 B2 | 2/2012 | Getman | |
| 8,181,516 B2 | 5/2012 | Naydenov | |
| 8,225,654 B2 | 7/2012 | Muerset | |
| 8,776,595 B2 * | 7/2014 | Milone | 73/304 C |
| 2001/0000851 A1 * | 5/2001 | Morimoto | 73/304 C |
| 2002/0017131 A1 * | 2/2002 | Neuhaus et al. | 73/304 C |
| 2005/0229700 A1 * | 10/2005 | Chai et al. | 73/304 R |
| 2008/0066544 A1 * | 3/2008 | Tung et al. | 73/304 C |
| 2009/0165552 A1 * | 7/2009 | Sieh et al. | 73/304 C |
| 2009/0187357 A1 | 7/2009 | Ho et al. | |
| 2009/0301188 A1 * | 12/2009 | Calcote | 73/304 C |
| 2010/0126268 A1 | 5/2010 | Baily et al. | |
| 2010/0186526 A1 | 7/2010 | Thompson et al. | |
| 2010/0231245 A1 * | 9/2010 | Aeshliman et al. | 324/694 |
| 2010/0313654 A1 | 12/2010 | Malinovskiy et al. | |
| 2010/0326186 A1 | 12/2010 | Kamp et al. | |
| 2010/0326282 A1 | 12/2010 | Carbonini et al. | |
| 2013/0298667 A1 * | 11/2013 | Bechtel et al. | 73/304 C |
| 2014/0305202 A1 * | 10/2014 | Periyathamby et al. | 73/304 C |

* cited by examiner

LIQUID LEVEL SENSING SYSTEM

RELATED APPLICATION

This application claims priority under 35 USC §119(e) to U.S. Provisional Patent Application No. 61/598,320 filed on Feb. 13, 2012. The entire disclosure of this provisional patent application is hereby incorporated by reference.

BACKGROUND

A liquid sensing system can comprise a vessel, a liquid contained within the vessel, and two spaced apart electrodes for sensing the fluid level in the vessel. If the liquid is dielectric (e.g., fuel), the fluid level can be determined by the capacitance created between the two spaced electrodes. If the liquid is electrically conducting (e.g., water), the fluid level can be determined by the presence of a current path between the two spaced electrodes.

SUMMARY

A linear liquid level sensing system is provided wherein a single collector can be used to determine the level of an electrically conducting liquid (e.g., water). The system is accurate, easy to manufacture, and convenient to incorporate into a range of volumes. In conventional dual-electrode systems (wherein one electrode acts as the anode and the other as the cathode), corrosion is a problem. A collector, isolated from the liquid, resolves this problem. The collector can be mounted within a liquid-containing vessel whereby it is partially submerged in the liquid. Alternatively, the collector can be mounted outside of the vessel if the vessel is made of an insulating material.

DRAWINGS

DESCRIPTION

Figure 1:
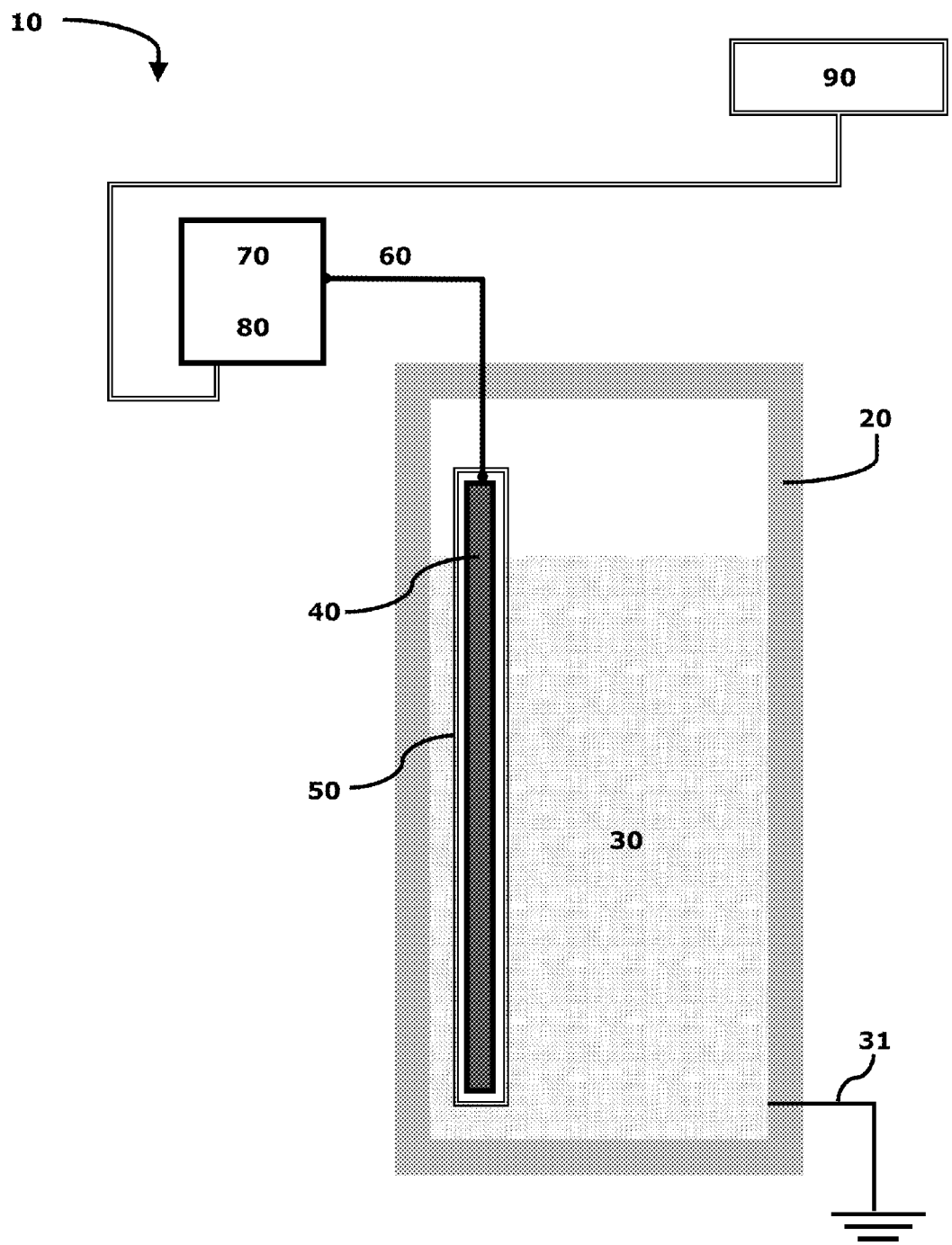
FIG. 1 shows a liquid level sensing system wherein an electrically conductive liquid is contained within a vessel which is electrically conductive.

Referring now to the drawings, a liquid level sensing system 10 is schematically shown. The system 10 can comprise a vessel 20 and an electrically-conductive liquid 30 contained within the vessel 20, with the liquid 30 having an electrical ground 31. The vessel 20 can be, for example, a tank or other container located outside, situated within a stationary structure, and/or installed on a vehicle (e.g., an aircraft). The liquid 30 can be water (e.g., potable water, rainwater, gray water, etc.), a water-based solution or mixture, or any other electrically conducting fluid.

The linear liquid level sensing system 10 is characterized by a single collector 40. The collector 40 spans a distance corresponding to a desired-level determining range which, in many cases, will extend between near-empty levels to near-full levels. The collector 40 can be made, for example, from a metal or an electrically-conducting polymer.

The collector 40 is encased in an insulator 50 so as to define a dielectric gap between the fluid 30 and the collector 40. The insulation area in contact with the fluid 30 will correlate with its level within the vessel 20. Specifically, for example, the higher the level the more insulation area is in contact with the fluid 30. The insulator 50 can comprise a dielectric sleeve made from a plastic insulation material (e.g., polytetrafluoroethylene (PTFE), perfluoroalkoxyethylene (PFA), polypropylene (PP), etc.).

The liquid level sensing system 10 is characterized by a single electrical line 60 connected to the collector 40. This single line 60 connects both a voltage-supplying source 70 and a charge-sensing device 80 to the collector 40. To determine the liquid level within the vessel 20, the source 70 supplies a certain voltage to the collector 40 through the line 60, and then the device 80 senses the charge induced on the collector 40 through the same line 60. The induced charge will correlate to the area of the insulation 50 in contact with the fluid 30, and thus will correlate with the fluid level within the vessel 20.

A display panel 90 can be operably connected to the charge-sensing device 80 to display a level-related parameter. This panel 90 can be located near the vessel 20 or at a remote location.

In FIG. 1, the vessel 20 is made of a material which is electrically conductive (e.g., metal). The vessel 20 is electrically grounded to thereby provide the electrical ground 31 for the liquid 30. The collector 40 is situated within the vessel 20 and at least partially submerged within the liquid 30.

Figure 2:
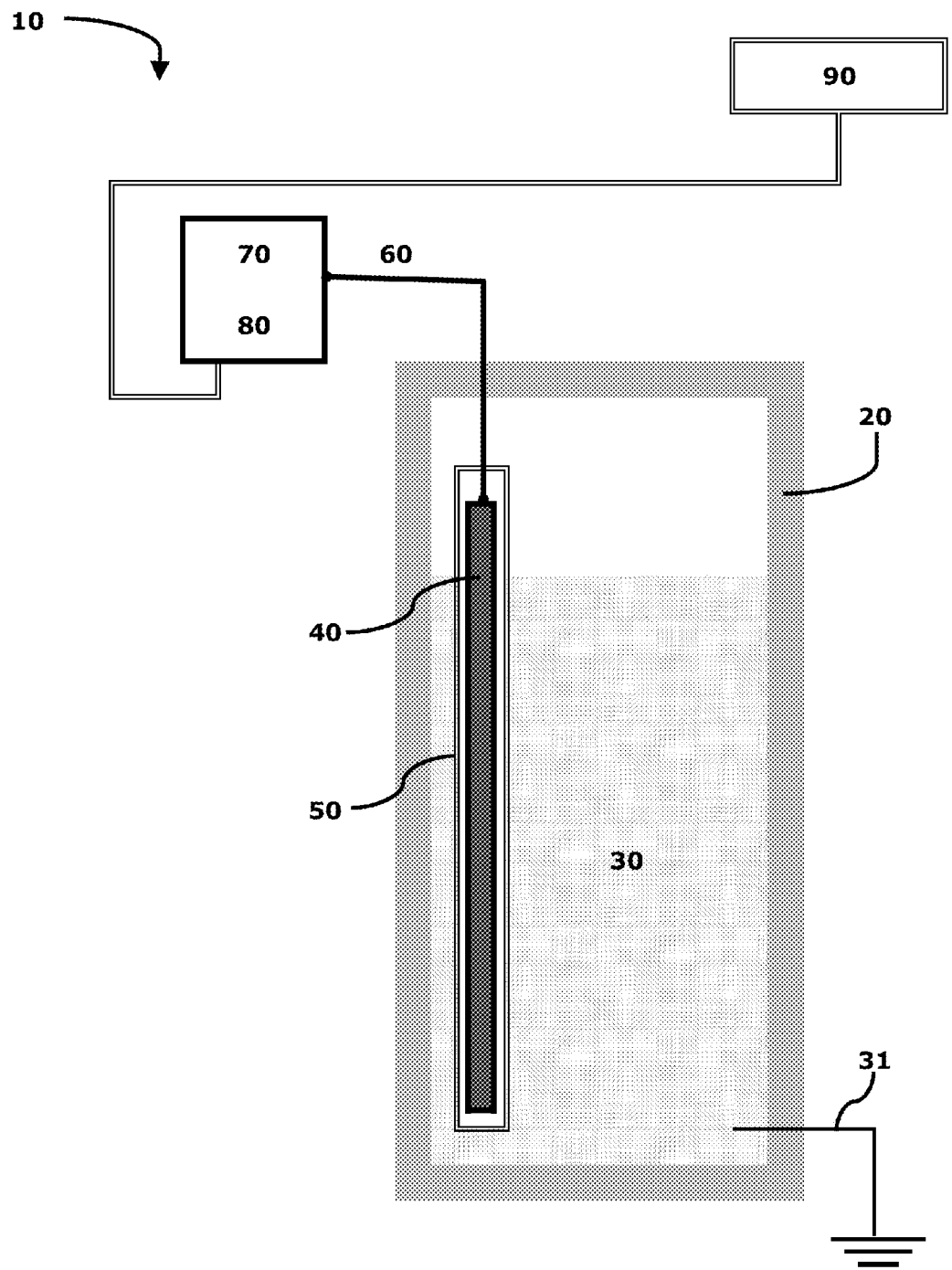
FIGS. 2-3 shows a liquid level sensing system wherein an electrically conductive liquid is contained within a vessel which is not electrically conductive.

In FIG. 2, the vessel 20 is made of material which is not electrically conductive (e.g., plastic) and the electrical ground 31 can extend through the vessel 20 to the liquid 30. The collector 40 is situated within the vessel 20 and at least partially submerged within the liquid 30.

Figure 3:
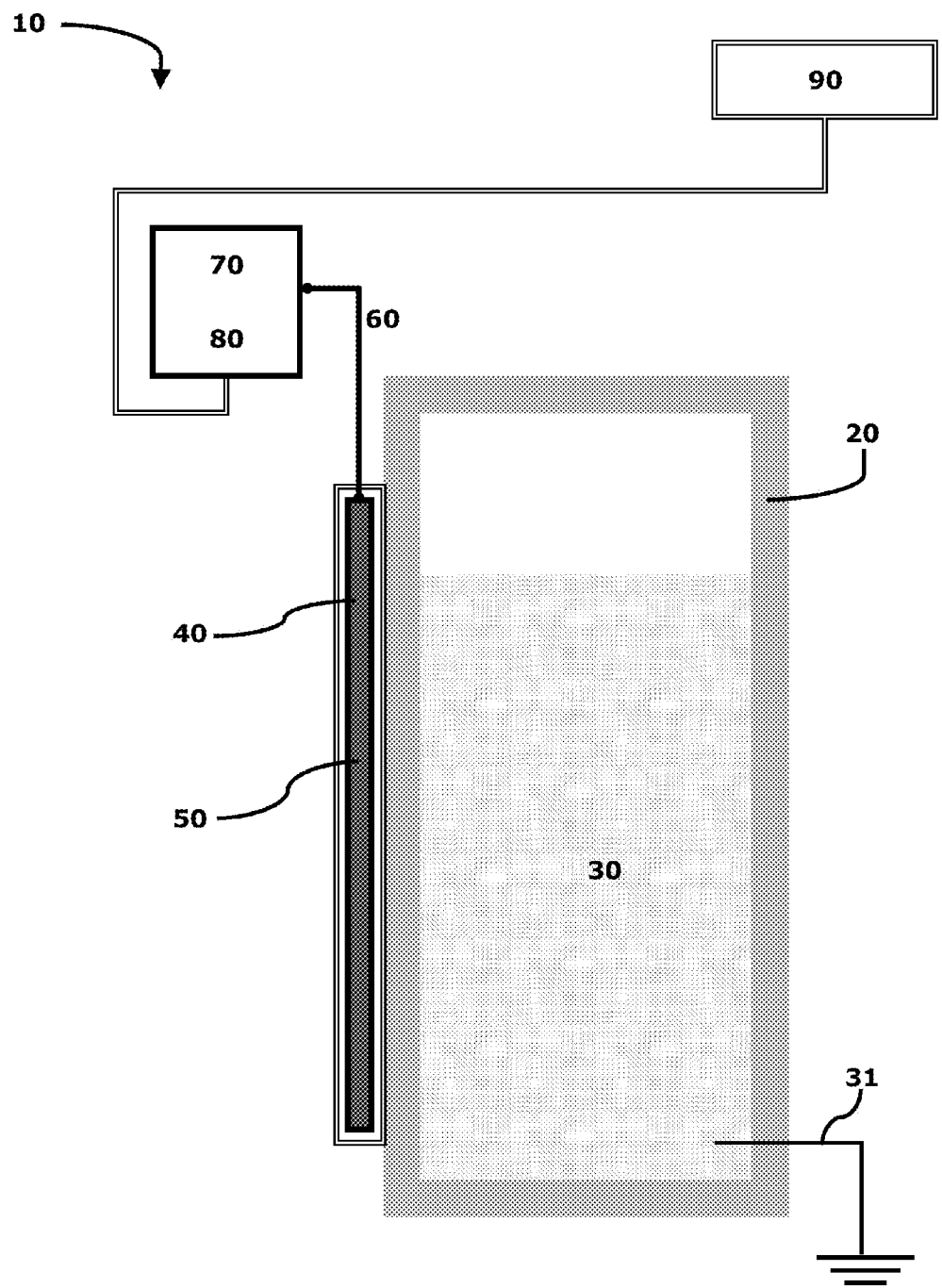

In FIG. 3, the vessel 20 is made of material which is not electrically conductive (e.g., plastic) and the electrical ground 31 can extend through the vessel 20 to the liquid 30. The collector 40 is situated outside the vessel 20, with the non-conducting vessel material serving as part of the insulation 50.

Although the level sensing system 10, the vessel 20, the liquid 30, the electrical ground 31, the collector 40, the insulation 50, the line 60, the voltage-supplying source 70, the charge-sensing device 80, and/or the display panel 80 have been have been shown and described as having certain forms and fabrications, such portrayals are not quintessential and represent only some of the possible of adaptations of the claimed characteristics. Other obvious, equivalent, and/or otherwise akin embodiments could instead be created using the same or analogous attributes.

The invention claimed is:

1. A linear liquid level sensing system comprising:
   an electrically conductive liquid with an electrical ground,
   a collector spanning a vertical distance corresponding to a desired-level-determining range,
   an insulator encasing the collector and having a liquid-contacting area which changes with the level of the liquid;
   a voltage-supplying source which supplies a voltage to the collector so that the collector incurs a charge corresponding to the vertical level of the conductive liquid that is in contact with the liquid-contacting area of the insulator;
   a charge-sensing device configured to sense the collector-incurred charge, wherein the collector-incurred charge correlates to the liquid-contacting area of the insulator; and
   a single electrical line electrically connecting both the voltage-supplying source and the charge-sensing device to the collector such that the voltage-supplying source supplies the voltage to the collector through the single electrical line and the charge-sensing device senses the charge induced on the collector through the same single electrical line.

2. A linear liquid level sensing system as set forth in claim 1, characterized by a single collector.

3. A linear liquid level sensing system as set forth in claim 1, wherein the vertical distance spanned by the collector extends at least from a near-empty level to a near-full level.

4. A linear liquid sensing system as set forth in claim 1, wherein the voltage-supplying source supplies a voltage to the collector and wherein the charge-sensing device senses voltage and capacitance.

5. A linear liquid sensing system as set forth in claim 1, comprising a display panel which displays a parameter related to the charge sensed by the charge-sensing device.

6. A linear liquid level sensing system as set forth in claim 1, wherein the electrically-conductive liquid is water.

7. A linear liquid level sensing system as set forth in claim 6, wherein the electrically-conductive liquid is potable water.

8. A linear liquid level sensing system as set forth in claim 1, comprising a vessel in which the electrically conductive liquid is contained.

9. A linear liquid level sensing system as set forth in claim 8, wherein the vertical distance spanned by the collector extends at least from a near-empty level to a near-full level.

10. A linear liquid level sensing system as set forth in claim 8, wherein the vessel is made of an electrically conductive material and wherein the collector is situated within the vessel and is at least partially submerged in the liquid.

11. A linear liquid level sensing system as set forth in claim 10, wherein the vessel is made of metal.

12. A linear liquid level sensing system as set forth in claim 10, wherein the vessel is a tank installed on an aircraft.

13. A linear liquid level sensing system as set forth in claim 8, wherein the vessel is made of an insulating material and wherein the collector is situated within the vessel and at least partially submerged in the liquid.

14. A linear liquid level sensing system as set forth in claim 13, wherein the vessel is made of plastic.

15. A linear liquid level sensing system as set forth in claim 13, wherein the vessel is a tank installed on an aircraft.

16. A linear liquid level sensing system as set forth in claim 8, wherein the vessel is made of an insulating material and wherein the collector is situated outside of the vessel and not submerged in the liquid.

17. A linear liquid level sensing system as set forth in claim 16, wherein the vessel is made of plastic.

18. A linear liquid level sensing system as set forth in claim 16, wherein the vessel is a tank installed on an aircraft.

* * * * *